United States Patent [19]
Freeman et al.

[11] Patent Number: 5,272,841
[45] Date of Patent: Dec. 28, 1993

[54] COMPOSITE METAL INTRUSION BEAM AND METHOD OF MAKING SAME

[75] Inventors: Richard B. Freeman, Oxford; Stephen E. Rawe, Clarkston, both of Mich.

[73] Assignee: The Budd Company, Troy, Mich.

[21] Appl. No.: 964,191

[22] Filed: Oct. 21, 1992

[51] Int. Cl.⁵ .................................. B60J 5/04
[52] U.S. Cl. ........................ 49/502; 52/738; 296/188
[58] Field of Search ............ 49/502, 501, 503; 296/146 C, 188; 52/738, 737, 720

[56] References Cited

U.S. PATENT DOCUMENTS

| | | | |
|---|---|---|---|
| 4,328,642 | 5/1982 | Presto | 49/502 |
| 4,831,710 | 5/1989 | Katoh et al. | 49/502 X |
| 5,056,861 | 10/1991 | Garnweidner et al. | 49/502 X |

Primary Examiner—Philip C. Kannan
Attorney, Agent, or Firm—Harness, Dickey & Pierce

[57] ABSTRACT

An intrusion beam structure for reinforcing a vehicle door includes an elongated member adapted to be attached to a surface of the inner panel of a door frame that is substantially parallel to the axis defined by the elongated member. The elongated member includes first and second end portions interdisposed by a middle portion. The end portions are constructed of a first material, and the middle portion is constructed of a second, different material. The elongated member is unitarily stamped from a composite sheet and is formed to include first and second mounting members, each having a planar surface adapted to mount to the inner panel.

19 Claims, 3 Drawing Sheets

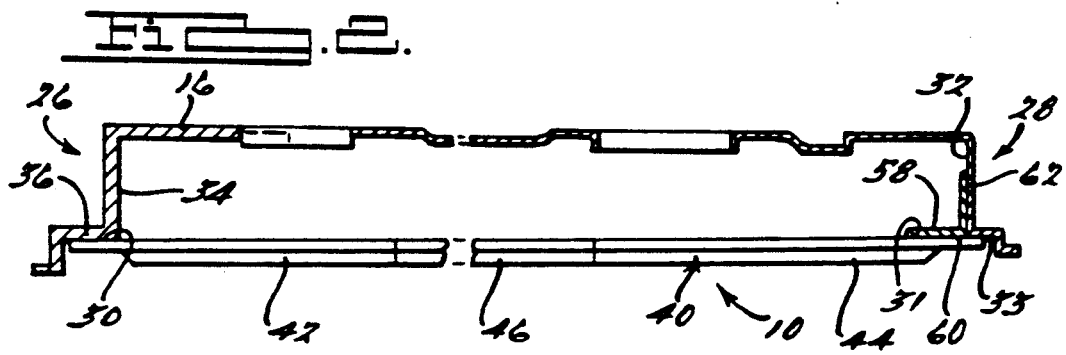
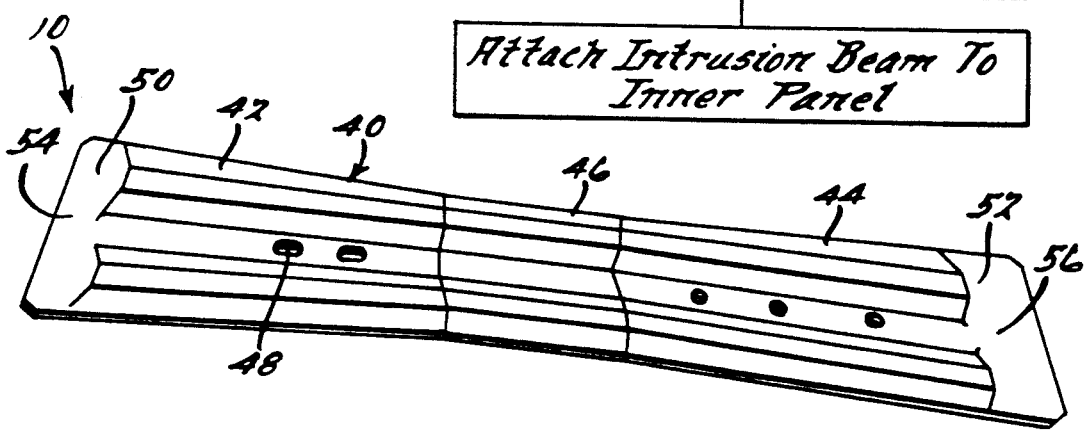

COMPOSITE METAL INTRUSION BEAM AND METHOD OF MAKING SAME

BACKGROUND OF THE INVENTION

1. Technical Field

The present invention relates generally to vehicle occupant protection. More particularly, the present invention relates to an intrusion beam for a vehicle door and a method for making the same.

2. Discussion

Conventional vehicle doors typically are equipped with a rigid intrusion beam structure to protect vehicle occupants from injuries resultant from a side impact. This practice has generally proven successful in meeting current side impact Federal Motor Vehicle Safety Standards (FMVSS) which require a static test. In the current test, which is technically a quasi-static test, a ram is slowly forced into the side of a stationary vehicle. The vehicle door is required to meet minimum specified force-deflection characteristics. There are three requirements of the current test—initial crush, intermediate crush and peak crush. The peak crush is a minimum specified load requirement that must be achieved during the first 18 inches that the ram is advanced into the side of the vehicle.

Extensive testing done with an anthropomorphic test device (ATD), otherwise known as a crash dummy, has indicated that the current standard is not entirely representative of actual side impact collisions, and further that compliance with the current standard is not necessarily sufficient to protect vehicle occupants. During a vehicle side impact collision, as with most dynamic collisions involving one object substantially stationary with respect to the direction of impact, two impacts actually occur. When a first car, the striking car, collides with a second car, the struck car, a first impact occurs immediately. Milliseconds later, the second impact occurs in which the occupant and the interior of the vehicle door collide. Importantly, it is this second impact which directly inflicts injury upon the vehicle occupant.

As a result of the current standards' inability to sufficiently replicate the results of a vehicle side impact collision, an amendment to the side impact standards (FMVSS 214), adopted Nov. 2, 1990, requires a dynamic test. In this test, a moving barrier, simulating a striking vehicle, impacts a stationary vehicle at a speed of 33.5 miles per hour. Thoratic and pelvic accelerations taken from the ATD are monitored. The accelerations are then compared with specified maximums provided by the amended standard. The FMVSS dynamic requirements will be in addition to the static, or quasi-static, requirements of the current standard. Dynamic standards are scheduled to be gradually implemented begin in 1994.

The applicability of the two tests is listed immediately below.

| VEHICLE TYPE | STATIC | DYNAMIC |
| --- | --- | --- |
| PASSENGER CARS | CURRENT | 10% 09-01-1993 |
| | | 25% 09-01-1994 |
| | | 40% 09-01-1995 |
| | | 100% 09-01-1996 |
| LIGHT TRUCKS | 90% 09-01-1993 | NOT CURRENTLY |
| | 100% 09-01-1994 | PLANNED |

With the retention of the current test, coupled with the pending adoption of the dynamic test, it is critical that intrusion beam structures be designed so that a vehicle door is capable of meeting both standards. It is recognized by those skilled in the art that dynamic test results can be greatly improved through the addition of padding and minor structural changes to the belt-line region of the door. Accordingly, a need exists for intrusion beam designs which meet static requirements while also permitting sufficient space for such padding and structural changes necessary to improve dynamic test results.

Historically the most difficult portion of the static test is the initial crush requirement. During the test the loading ram is placed in contact with the outer panel which may be located ½ inch or more from the intrusion beam. The load does not increase appreciably until the ram contacts the intrusion beam. Therefore, the initial stiffness of the door beam is critical.

The stiffness of an intrusion beam structure is controlled by the modulus of elasticity of the material and the moment of inertia of the beam cross section. The moment of inertia is dependent on section geometry. The most efficient way to increase the moment of inertia is to increase cross-sectional depth. However, the cross-sectional depth is limited by internal door packaging requirements and component weight restrictions. Increasing the section depth also results in higher beam stresses for a given displacement. This leads to an early yield point in the load vs. displacement curve, and is potentially detrimental to an intrusion beam's performance.

Heretofore, many intrusion beams having the practical cross-sections capable of meeting the initial stiffness requirement of the static test result in yield or collapse after only a few inches of ram penetration. During the static test, after the initial crush, an intrusion beam makes a transition from that of a bending member to a tensile member. In the tensile mode, significantly large tensile loads are transferred to the ends of the intrusion beam.

Several devices used to reinforce vehicle doors from the impact of a side collision are known. U.S. Pat. No. 3,868,141 to Johnson relates to elongated members disposed vertically between the exterior panels of a vehicle door. U.S. Pat. No. 3,700,076 to Forsting et al. relates to an energy absorbing band anchored on the door end walls. U.S. Pat. No. 4,328,642, relates to a stamped intrusion beam attached to the inner door frame of a vehicle.

None of the above-discussed devices is without its problems. While these known devices may have proven satisfactory for applications in the past, their efficiency, cost, methods of manufacture, and occupant protection capacity can be improved.

SUMMARY OF THE INVENTION

In accordance with the teachings of the present invention, an intrusion beam structure for a vehicle door having a door frame with an inner panel is provided. The intrusion beam comprises an elongated member which includes first and second end portions interdisposed between a middle portion. The intrusion beam further comprises mounting members adapted for mounting the elongated member directly to the inner panel of the door frame. Preferably, the middle portion of the elongated member is formed of a first metal, while the first and second end portions are formed of a second, different metal.

Further in accordance with the teachings of the present invention, a method of constructing a reinforced vehicle door having a frame with an inner panel and including an intrusion beam structure is provided. The method comprises the steps of aligning and permanently fastening a plurality of sheets of metal to form a composite sheet. The method further comprises the steps of shearing the composite sheet into a plurality of intrusion beam structure blanks and stamping the intrusion beam structure blanks. The resultant intrusion beam structure includes first and second end portions interdisposed between a middle portion. If necessary, the method includes the step of restamping the first and second end portions, to thereby bring the first and second ends within dimensional tolerances. Preferably, the method of the present invention further comprises the step of attaching the first and second end portions to the inner panel of the door frame.

Still other features of this invention are directed to particular constructions of the mounting members which are adapted to mount the elongated member to the inner panel of the vehicle door frame.

BRIEF DESCRIPTION OF THE DRAWINGS

The various advantages of the present invention will become apparent to those skilled in the art from analysis of the following written specification and by reference to the accompanying drawings in which:

FIG. 2 is a simplified cross-sectional view taken along lines 2—2 of FIG. 1, with the intrusion beam mounted in position;

FIG. 3 is a perspective view of the intrusion beam of FIG. 1;

FIG. 7 is a flow chart illustrating the general steps carried out in making the door module designated with reference numeral 12 in FIG. 1.

DESCRIPTION OF THE PREFERRED EMBODIMENTS

Figure 1:
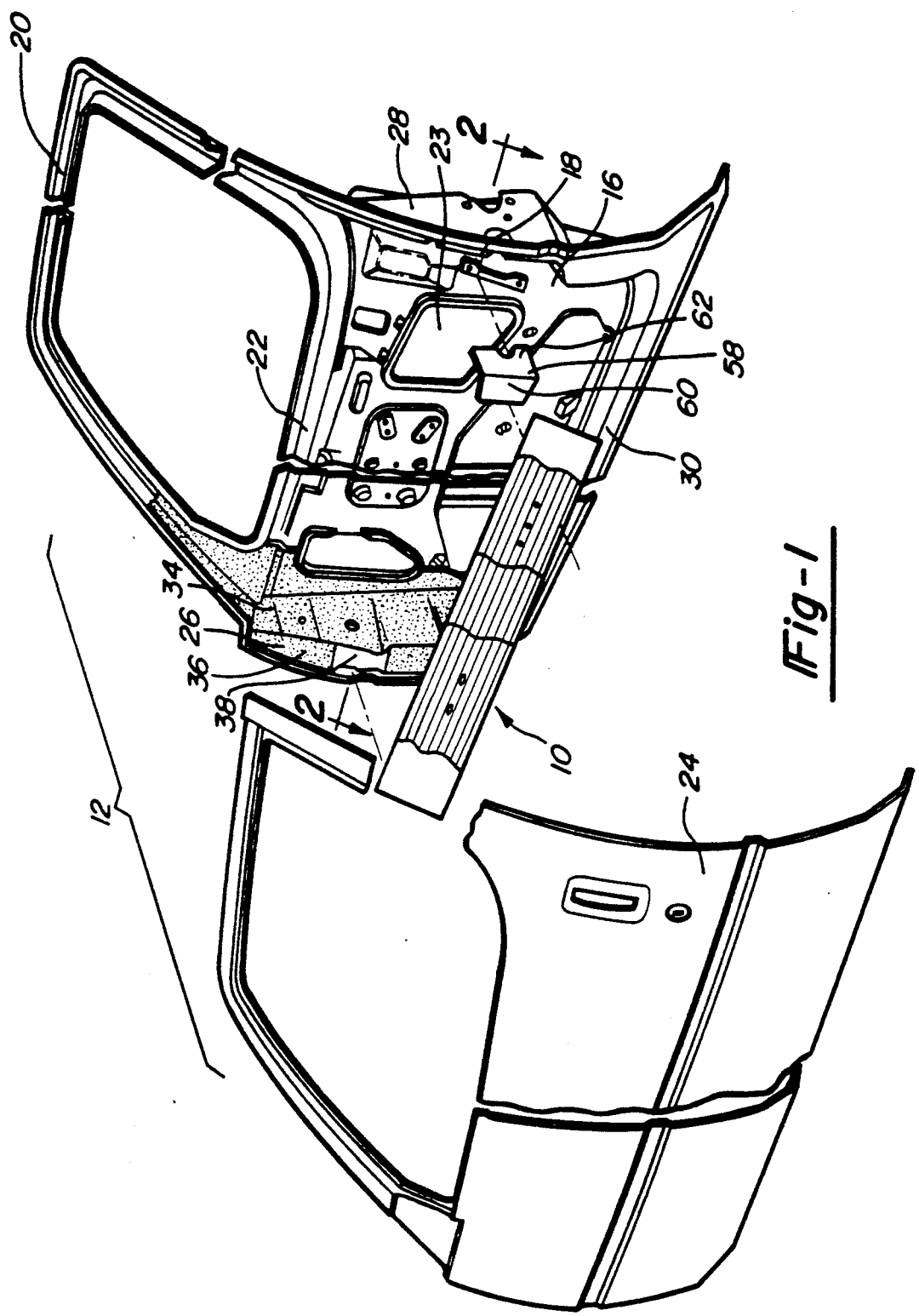
FIG. 1 is an exploded perspective view of a door structure constructed in accordance with the teachings of the present invention.

As generally shown in FIG. 1, the intrusion beam structure 10 of the present invention is designed to be mounted on in a vehicle door 12, thereby reinforcing the door 12 and protecting the occupants of the vehicle. The door 12 into which the present invention is to be incorporated may be of traditional construction having a door frame 14 with an inner panel 16. The inner panel 16 is formed by stamping galvanized sheet metal to define a shape corresponding to that of the door opening in the vehicle with which it will be used. The inner panel 16 is formed to include a lower generally rectangular portion 18 and an upper generally trapezoidal portion 20 generally defining a window opening. The intersection of the upper and lower portions is commonly referred to as the belt-line 22.

Below the belt-line 22, the inner panel 16 is typically provided with a plurality of openings 23 for access to internal mechanisms such as window regulators and door latches (not shown) which are operatively disposed within the vehicle door 12 between the inner panel 16 and an outer panel 24. Also below the belt-line, the inner panel 16 includes front and rear lower leg portions 26 and 28 (alternatively referred to as laterally-extending side walls) connected by a bottom leg portion 30. The rear leg portions 28 includes a side wall portion 32 extending substantially perpendicular to the lower rectangular portion 18, and a mounting wall portion 33 dependent therefrom. The front leg portion 26 is formed to include a side wall portion 34 extending substantially perpendicular to the lower rectangular portion 18, and a mounting wall portion 36 dependent therefrom. The mounting wall portions 33, 36 are each disposed substantially parallel to the lower portion 18.

The mounting wall portions 33, 36 of the inner panel 16 is adapted to cooperate with the intrusion beam for mounting thereto. Further in this regard, the mounting wall portions 33, 36 can be formed to include an area 38 adapted to receive an end of the intrusion beam structure 10.

The outer panel 24 of the door is preferably formed of a sheet molded compound (SMC) and is adapted for attachment to the inner panel 16. In this regard, the outer panel includes an outer surface which is exposed to the environment and inner surface adapted to mate with the inner panel 16. The door 12 is designed to be attached between two vertical posts (not shown) in a vehicle. Much of the focus of this invention is directed towards the construction of intrusion beam structure 10 and its mounting to the door 12.

Turning to FIGS. 1–3, a preferred embodiment of the present invention is illustrated. The intrusion beam structure 10 of the present invention comprises an elongated member 40 that is a metal stamping. The elongated member 40 is formed to include first and second end portions 42, 44 interdisposed by a middle portion 46. The middle portion 46 of the elongated member 40 is formed from a first material. The first and second end portions 42, 44 are formed from a second, different, material. Preferably, the elongated member 40 is formed in a single stamping operation from a composite blank. The advantages of such a composite structure include improved dimensional integrity of the first and second end portions 42, 44 and a weight reduction as compared to traditional beams, stamped or otherwise.

In the preferred embodiment, the middle portion 46 of the elongated member 40 is constructed of high strength steel having a yield strength of approximately 100 kpsi. Further, in the preferred embodiment, the first and second end portions 42, 44 are constructed of cold rolled steel having a yield strength of approximately 40 kpsi. As will be discussed in greater detail below, the first and second end portions 42, 44 are welded, or otherwise suitably permanently fastened to the intermediate portion 46. The elongated member 40 may be formed to include apertures 48 necessary for accommodating various door hardware or wiring.

The intrusion beam structure of the present invention further comprises means for mounting the elongated member 40 to a door frame 14 of a vehicle (not shown). This means for mounting the elongated member 40 to the door frame 14 preferably comprises first and second mounting members 50, 52 integrally formed with the first and second end portions 42, 44, respectively.

Each mounting member 50, 52 includes a substantially planar portion 54, 56, respectively, adapted to mount to the inner panel 16 of the door frame 14. Each planar surface 54, 56 is disposed substantially parallel to the axis defined by the elongated member 40. Heretofore, dimensional tolerance limitations have generally limited the prior art to intrusion beam structures mounted to at most one surface which is parallel to the axis of the intrusion beam structure. In this regard, dimensional tolerance necessitated the prior art to mount at least one end of the elongated member to a surface on the door frame substantially perpendicular to the axis defined by the elongated member. Such mounting is not ideal for load transfer. As will become more apparent in the discussion below regarding the method of the present invention, this load transfer problem is overcome by providing an intrusion beam structure 10 having first and second mounting portions 50, 52 adapted to mount to surfaces of the inner panel 16 of the door frame 14 which are substantially parallel to the axis defined by the elongated member 40.

The first and second mounting members 50, 52 are unitarily formed with the remainder of the elongated member 40. In this regard, the entire elongated member 40 is formed from a single stamping operation from a composite sheet. Preferably, the first and second mounting members 50, 52 are welded to the door 12. However, it will be appreciated by those skilled in the art that apertures (not shown) may be provided in the mounting members 50, 52 for bolting to the door 12, or the mounting members 50, 52 can be bonded to the door 12.

The first mounting member 50 is formed to be cooperatively received within the area 38 formed in the mounting wall 36. The second mounting member 52 is mounted to the mounting wall 33. In the preferred embodiment, a metal bracket 58 is provided for additional reinforcement. The bracket 58 also serves to reinforce the latch area of the door frame 14. The bracket 58 is generally L-shaped, having a first leg 60 and a second leg 62. The first leg 60 includes a planar surface to which the second mounting member 52 can be welded, or otherwise suitably fastened. Similarly, the second leg 62 is adapted to be welded, or otherwise suitably fastened to the side wall portion 32.

The composite nature of the elongated member 40 of the intrusion beam structure 10 allows choices of various materials to be tailored to specific strength requirements. That is, various parameters within the first and second end portions 42, 44 and the intermediate portion 46 can be independently altered in order to achieve desired strength and load characteristics. Such parameters include material choice, the width of the elongated member 40, the length of each portion 42, 44 and 46, and the thickness of each portion 42, 44 and 46. Additionally, it will be readily appreciated by those skilled in the art, that these parameters can be changed by altering the stamping pattern. The particular stamping pattern illustrated throughout the figures is merely exemplary and accordingly forms no part of the present invention.

Figure 4:
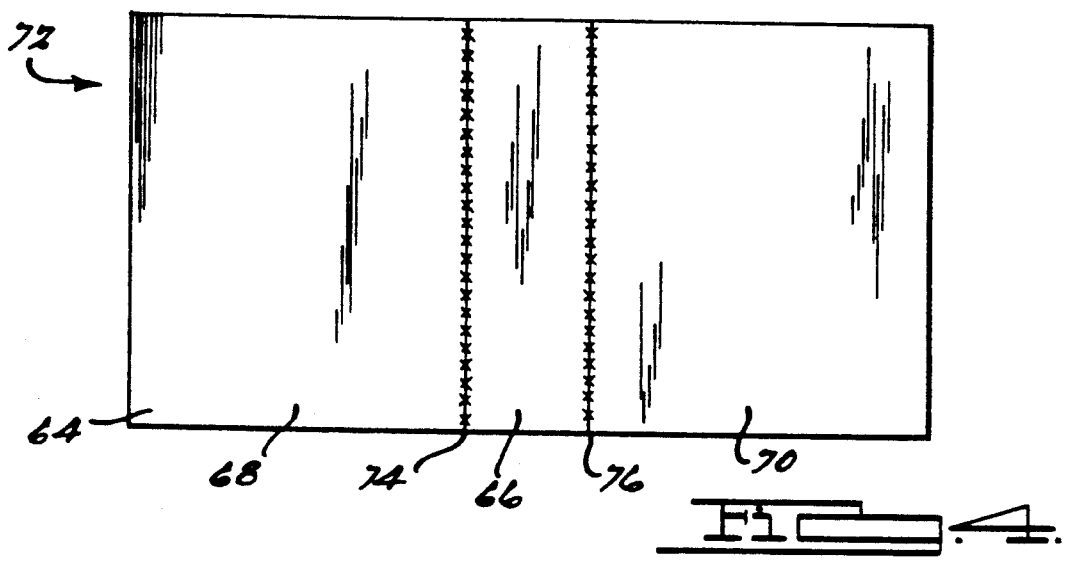
FIG. 4 illustrates a preferred method of welding a plurality of sheets of metal to form a composite sheet.
Figure 5:
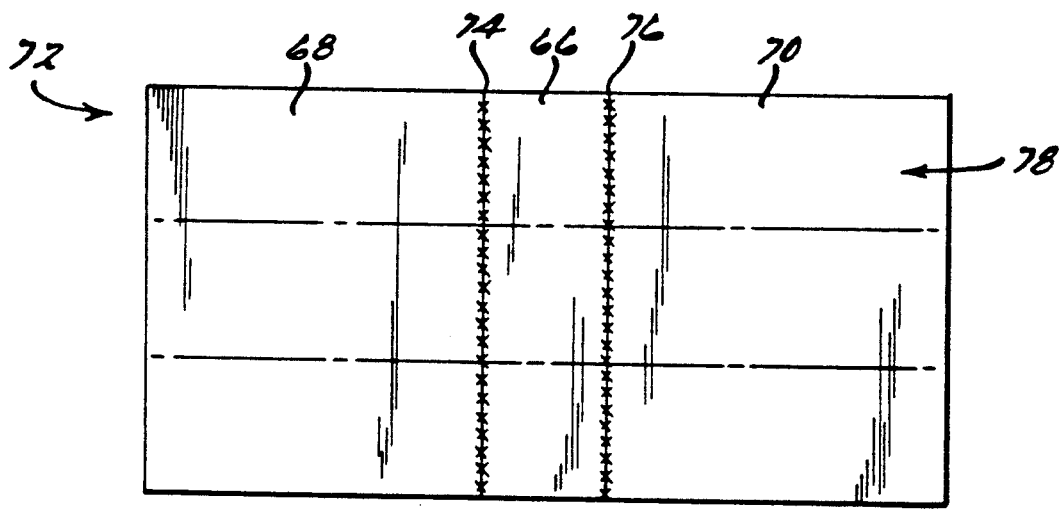
FIG. 5 illustrates a preferred method shearing the composite of FIG. 4 into blanks.
Figure 6:
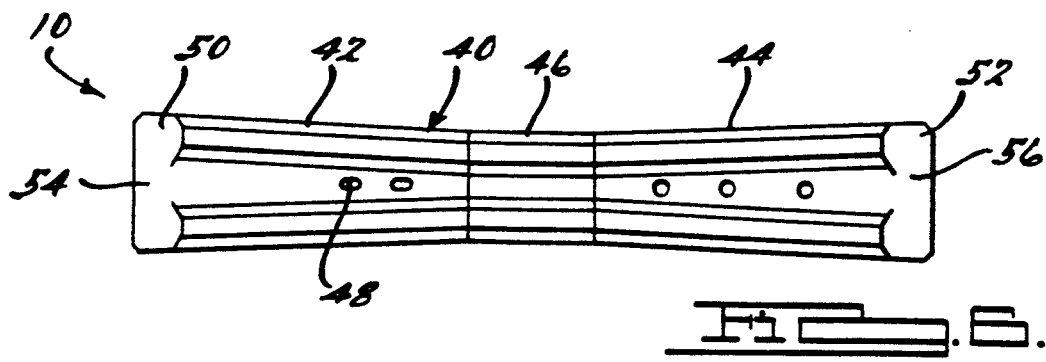
FIG. 6 illustrates a front view of an intrusion beam stamped out of one of the blanks of FIG. 5.

Turning now to FIGS. 3-5, the method of constructing a reinforced vehicle door 12 including the intrusion beam structure 10 heretofore detailed, will now be described. To begin, as shown in FIG. 3, a plurality of sheets of metal 64 are aligned and permanently fastened. Preferably, three sheets 64, each having a length and width are lengthwise adjacently aligned. In this regard, a first sheet 66 is interdisposed between a second sheet 68 and a third sheet 70, opposing lateral edges of the first sheet 66 being positioned adjacent a lateral edge of the second sheet 68 and third sheet 70, respectively. Preferably, the first sheet 66 is a first metal having a first set of characteristics, and the second and third sheets 68, 70 are of a second, different, metal having different characteristics.

Further, in the preferred method, the three sheets 66, 68, 70 are laser welded together to form a composite sheet 72. This is accomplished by first welding along a first joint 74 formed between the first sheet 66 and the second sheet 68, and next welding along a second joint 76 formed between the first sheet 66 and the third sheet 70. Accordingly, the first joint 74 is substantially parallel to the second joint 76. It will be appreciated by those skilled in the art that any suitable method of permanently fastening the sheets 66, 68, 70 will suffice, such as bonding or conventional welding.

The method of the present invention further comprises shearing the composite sheet 72 into a plurality of intrusion beam structure blanks 78. The composite sheet 72 is sheared in a direction (shown in dotted lines in FIG. 5) substantially perpendicular to the first and second joints 74, 76. The second and third sheets 68, 70 form the first and second end portions 42, 44 respectively, and the first sheet forms the middle portion 46.

The next step of the present invention comprises stamping one of the intrusion beam structure blanks 78 to form the final product. As will be appreciated by those skilled in the art, stamping of a part having a length as great as the intrusion beam structure 10 of the present invention often results in dimensional distortions, particularly near the ends. The incorporation of a cold rolled steel for the first and second end portions 42, 44 allows the first and second end portions 42, 44 to be restamped, if necessary, to bring the intrusion beam structure 10 within required dimensional tolerances. In this regard, cold rolled steel is not fraught with the high spring-back qualities of low alloy steel.

Finally, the method of the present invention comprises attaching the first and second mounting portions 50, 52 to the mounting walls 33, 36, respectively, of the inner panel 16 of the door frame 14. Either end portion 50, 52 can be additionally indirectly attached to the inner panel 16 through a bracket, such as bracket 58.

In the exemplary embodiment illustrated in FIG. 1, the first and second mounting portions 50, 52 are welded to the inner panel 16 of the door frame 14. However, it will be appreciated by those skilled in the art that any other suitable form of permanent fastening will suffice, including bolting and bonding.

The foregoing discussion disclose and describes merely exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A reinforced vehicle door structure for protecting a vehicle occupant against injury from a lateral impact to the vehicle, the vehicle door structure comprising:
  a door frame including first and second downwardly extending legs interconnected by an inner panel, said first leg extending along the front edge of said door frame and said second leg extending along the rear edge of said door frame;
  a composite intrusion beam structure having a middle portion interdisposed between first and second end portions, said middle portion being a first metal and said first and second end portions each being a second metal, said second metal being different from said first metal; and means for mounting said intrusion beam structure to a surface substantially parallel to an axis defined by said elongated member;

wherein a substantial portion of said composite intrusion beam structure is spaced apart from said inner panel.

2. The reinforced vehicle door of claim 1, wherein said first and second downwardly extending leg portions including first and second dependent wall portions, respectively, the first and second dependent wall portions each being disposed substantially parallel to said inner panel and further wherein said intrusion beam structure is attached directly to at least one of said first and second dependent wall portions.

3. The reinforced vehicle door of claim 1, wherein said middle portion is laser welded to said first and second end portions.

4. The reinforced vehicle door of claim 3, wherein said composite intrusion beam structure is unitarily stamped from a composite blank.

5. The reinforced vehicle door of claim 4, wherein said means for mounting the composite intrusion beam structure comprises first and second mounting members, each mounting member including a substantially planar portion.

6. The reinforced vehicle door of claim 5, wherein said first and second mounting members are integrally formed with said first and second end portions, respectively.

7. The reinforced vehicle door of claim 1, further comprising a bracket member interconnecting said composite intrusion beam structure and said frame.

8. A reinforced vehicle door structure for protecting an occupant of a vehicle against injury from a lateral impact to said vehicle by limiting penetration and absorbing energy, the vehicle door structure comprising:

a door frame including first and second downwardly extending legs, said first leg extending along the front edge of said door frame and said second leg extending along the rear edge of said door frame;

an elongated member having a predetermined strength characteristic and a predetermined load characteristic including a middle portion interdisposed between first and second end portions, said middle portion being a first metal and said first and second end portions being a second metal, said second metal being different from said first metal, said first and second end portions each having a length greater than the length of said middle portion; and means for mounting said elongated member to a surface substantially parallel to an axis defined by said elongated member;

whereby said strength and load characteristics of said elongated member are adjustable by altering the relative lengths of said middle portion and said end portions.

9. The door structure of claim 8, wherein said first metal has a yield strength substantially greater than the yield strength of said second metal.

10. The door structure of claim 9, wherein said elongated member is unitarily stamped from a composite blank.

11. The door structure of claim 8, wherein said first and second downwardly extending legs are interconnected by an inner panel, and further wherein said first and second downwardly extending legs include first and second dependent wall portions, respectively, said first and second dependent wall portions each being disposed substantially parallel to said inner panel.

12. The door structure of claim 8, wherein said means for mounting the elongated member comprises first and second mounting members, each mounting member including a substantially planar portion, at least one of said first and second mounting members being attached directly to said frame.

13. The door structure of claim 12, wherein said first and second mounting members are integrally formed with said first and second end portions, respectively.

14. A reinforced vehicle door structure for protecting a vehicle occupant against injury from a lateral impact to said vehicle, the vehicle door structure comprising:

a door frame including first and second downwardly extending legs interconnected by an inner panel, said first leg extending along the front edge of said door frame and said second leg extending along the rear edge of said door frame;

an elongated member for limiting penetration and absorbing energy, said elongated member including a middle portion interdisposed between first and second end portions, said middle portion being a first metal and said first and second end portions being a second metal, said second metal being different from said first metal, said first and second end portions each having a length greater than the length of said middle portion; and means for mounting said elongated member to a surface substantially parallel to an axis defined by said elongated member;

wherein a substantial portion of said elongated member is spaced apart from said inner panel.

15. The door structure of claim 14, wherein said first metal has a yield strength substantially greater than the yield strength of said second metal.

16. The door structure of claim 15, wherein said elongated member is unitarily stamped from a composite blank.

17. The door structure of claim 14, wherein said first and second downwardly extending legs include first and second dependent wall portions, respectively, said first and second dependent wall portions each being disposed substantially parallel to said inner panel.

18. The door structure of claim 14, wherein said means for mounting the elongated member comprises first and second mounting members, each mounting member including a substantially planar portion, at least one of said first and second mounting members being attached directly to said frame.

19. The door structure of claim 18, wherein said first and second mounting members are integrally formed with said first and second end portions, respectively.

* * * * *

UNITED STATES PATENT AND TRADEMARK OFFICE
CERTIFICATE OF CORRECTION

PATENT NO. : 5,272,841
DATED : Dec. 28, 1993
INVENTOR(S) : Richard B. Freeman and Stephen E. Rawe It is certified that error appears in the above-indentified patent and that said Letters Patent is hereby corrected as shown below:

TITLE PAGE, [56]
References Cited,
U.S. Patent Documents:   the following patent references are missing and should be cited

| | | | | | |
|---|---|---|---|---|---|
| 3,300,901 | 1/1967 | Eckel | 4,378,395 | 3/1983 | Asoshina et al |
| 3,700,076 | 10/1972 | Forsting et al | 4,434,580 | 3/1984 | Engelsberger et al |
| 3,782,036 | 1/1974 | Clark et al | 4,861,097 | 8/1989 | Wycech |
| 3,829,149 | 8/1974 | Stevens | 4,866,883 | 9/1989 | Brown et al |
| 3,868,141 | 2/1975 | Johnson | 4,901,500 | 2/1990 | Wycech |
| 4,090,734 | 5/1978 | Inami et al | 4,306,381 | 12/1981 | Presto |
| 4,369,608 | 1/1983 | Miura et al | 4,378,394 | 3/1983 | Miura et al |
| 4,919,473 | 4/1990 | Laimighofer et al | 4,978,562 | 12/1990 | Wycech |

Col. 1, line 50    "Thoratic" should be --Thoracic--
Col. 1, line 57    "begin" should be --beginning--
Col. 4, line 7     "portions" should be --portion--
Col. 6, line 50    "disclose" should be --discloses--

Signed and Sealed this

Twelfth Day of July, 1994

Attest:

BRUCE LEHMAN

*Attesting Officer*    *Commissioner of Patents and Trademarks*